(12) United States Patent
Galler et al.

(10) Patent No.: US 10,557,348 B2
(45) Date of Patent: Feb. 11, 2020

(54) DEVICE FOR THE INSTALLATION OF ROCK BOLTS AND CUTTING APPARATUS

(71) Applicant: SANDVIK INTELECTUAL PROPERTY AB, Sandviken (SE)

(72) Inventors: Thomas Galler, Katsch/Mur (AT); Martin Kupper, Velden am Worthersee (AT)

(73) Assignee: SANDVIK INTELECTUAL PROPERTY AB, Sandviken (SE)

( * ) Notice: Subject to any disclaimer, the term of this patent is extended or adjusted under 35 U.S.C. 154(b) by 159 days.

(21) Appl. No.: 15/517,183

(22) PCT Filed: Oct. 2, 2015

(86) PCT No.: PCT/EP2015/072842
§ 371 (c)(1),
(2) Date: Apr. 6, 2017

(87) PCT Pub. No.: WO2016/055379
PCT Pub. Date: Apr. 14, 2016

(65) Prior Publication Data
US 2017/0298731 A1    Oct. 19, 2017

(30) Foreign Application Priority Data

Oct. 6, 2014    (WO) ................ PCT/EP2014/071334

(51) Int. Cl.
*E21D 20/00*    (2006.01)
*E21C 35/06*    (2006.01)
(Continued)

(52) U.S. Cl.
CPC .............. *E21C 35/06* (2013.01); *E21C 25/06* (2013.01); *E21C 25/18* (2013.01); *E21C 27/24* (2013.01);
(Continued)

(58) Field of Classification Search
CPC ....... E21C 11/00; E21C 35/04; E21D 20/003; E21B 7/025
See application file for complete search history.

(56) References Cited

U.S. PATENT DOCUMENTS 4,346,766 A * 8/1982 Manten ................ E21D 20/003
173/189
5,938,376 A * 8/1999 Alcaraz ................ E21B 15/006
173/31

(Continued)

FOREIGN PATENT DOCUMENTS

CN    2918705 Y    7/2007
CN    201068799 Y    6/2008
(Continued)

*Primary Examiner* — David J Bagnell
*Assistant Examiner* — Michael A Goodwin
(74) *Attorney, Agent, or Firm* — Corinne R. Gorski

(57) ABSTRACT

A device for the installation of rock bolts includes a supporting structure and first and second bolting units mounted to the supporting structure. Each bolting unit is configured for drilling an installation hole and/or for installing a rock bolt into a rock face, wherein the supporting structure is configured for rotatably moving the first and second bolting units about a common axis of rotation. At least one actuator is mounted to the supporting structure and configured for additionally moving at least one of the first and second bolting units.

17 Claims, 12 Drawing Sheets

(51) Int. Cl.
*E21C 35/20* (2006.01)
*E21D 9/12* (2006.01)
*E21C 27/24* (2006.01)
*E21D 9/10* (2006.01)
*E21C 25/18* (2006.01)
*E21C 29/22* (2006.01)
*E21C 25/06* (2006.01)
*E21C 35/08* (2006.01)
*E21D 23/08* (2006.01)
*F16H 57/023* (2012.01)
*F15B 11/16* (2006.01)

(52) U.S. Cl.
CPC .............. *E21C 29/22* (2013.01); *E21C 35/08* (2013.01); *E21C 35/20* (2013.01); *E21D 9/1013* (2013.01); *E21D 9/1026* (2013.01); *E21D 9/1033* (2013.01); *E21D 9/1093* (2013.01); *E21D 9/12* (2013.01); *E21D 9/126* (2013.01); *E21D 20/003* (2013.01); *E21D 23/08* (2013.01); *F15B 11/16* (2013.01); *F16H 57/023* (2013.01); *F16H 2057/0235* (2013.01)

(56) References Cited

U.S. PATENT DOCUMENTS

| | | | |
|---|---|---|---|
| 2003/0230925 A1* | 12/2003 | Oishi | E21C 25/18 299/87.1 |
| 2005/0129466 A1 | 6/2005 | Walker et al. | |
| 2008/0093525 A1* | 4/2008 | Saf | E21B 7/025 248/674 |

FOREIGN PATENT DOCUMENTS

| | | | |
|---|---|---|---|
| CN | 103277123 A | | 9/2013 |
| CN | 104500086 A | | 4/2015 |
| DE | 1807972 A | | 6/1970 |
| DE | 20 2111 050 143 U1 | | 10/2012 |
| WO | WO9205339 A1 | * | 4/1992 |
| WO | 2010050872 A1 | | 5/2010 |
| WO | 2011093777 A1 | | 8/2011 |
| WO | 2012156841 A2 | | 11/2012 |
| WO | 2012156842 A2 | | 11/2012 |
| WO | 2012156884 A2 | | 11/2012 |
| WO | 2014090589 A2 | | 6/2014 |

\* cited by examiner

DEVICE FOR THE INSTALLATION OF ROCK BOLTS AND CUTTING APPARATUS

RELATED APPLICATION DATA

This application is a § 371 National Stage Application of PCT International Application No. PCT/EP2015/072842 filed Oct. 2, 2015 claiming priority of EP Application No. PCTEP2014071334, filed Oct. 6, 2014.

FIELD OF INVENTION

The present invention relates to a device for the installation of rock bolts.

Furthermore, the present invention relates to rock cutting apparatus suitable for creating tunnels or subterranean roadways and in particular, although not exclusively, to undercutting apparatus in which a plurality of rotating heads are capable of being slewed laterally outward and raised in the upward and downward direction during forward cutting.

BACKGROUND ART

A variety of different types of excavation machines have been developed for cutting drifts, tunnels, subterranean roadways and the like in which a rotatable head is mounted on an arm that is in turn movably mounted at a main frame so as to create a desired tunnel cross sectional profile. WO2012/156841, WO 2012/156842, WO 2010/050872, WO 2012/156884, WO2011/093777, DE 20 2111 050 143 U1. All described apparatus for mill cutting of rock and minerals in which a rotating cutting head forced into contact with the rock face as supported by a movable arm. In particular, WO 2012/156884 describes the cutting end of the machine in which the rotatable heads are capable of being raised and lowered vertically and deflecting in the lateral sideways direction by a small angle in an attempt to try enhance the cutting action.

WO 2014/090589 describes a machine for digging roadways tunnels and the like in which a plurality of cutting heads are movable to dig into the rock face via a pivoting arcuate cutting path. US 2003/0230925 describes a rock excavator having a cutter head mounting a plurality of annular disc cutters suitable to operate in an undercutting mode.

Furthermore, it has been observed that conventional cutting machines are not optimised to cut hard rock having a strength typically beyond 120 MPa whilst creating a tunnel or subterranean cavity safely and reliably of desired cross sectional configuration. Accordingly, what is required is a cutting machine that addresses these problems.

Further, different types of devices for the installation of rock bolts are known in the art. Such devices comprise a supporting structure carrying a bolting unit, wherein the bolting unit is configured for drilling a drill hole and moving a rock bolt into a rock face in order to secure the roof of a tunnel or subterranean roadway. Optional a mesh structure covering the rock face is used for additional protection against roof fall.

In order to provide sufficient support for a roof of a tunnel in most applications the bolts used to secure the mesh structure have to be nearly half of the tunnel width or tunnel height, respectively.

Since the devices for the installation of rock bolts often form part of a cutting apparatus suitable for creating tunnels and subterranean roadways, the bolting process must not lead to a delay of the generation of the tunnel. In order to accelerate the installation of the rock bolts, devices have been developed which are able to simultaneously drill two or more installation holes into the rock face.

DE 1 807 972 A describes a drilling device comprising a pair of drilling units, wherein the drilling units may be rotated about a common axis of rotation. However, the drilling holes that are created by means of this device are not orientated in radial direction to the common axis of rotation. This leads to the fact that the installed bolts have a reduced effective anchor length due to their offset to the radial direction. The reduced effective anchor length results in the need of longer bolts in order to provide a sufficient support for the roof of the tunnel.

SUMMARY OF THE INVENTION

It is an objective of the present invention to provide a device for the installation of rock bolts allowing for an accelerated rock bolt installation during the generation of a tunnel or a subterranean roadway.

It is a further objective of the present invention to provide a cutting machine suitable to form tunnels and subterranean roadways being specifically configured to cut hard rock beyond 120 MPa in a controlled and reliable manner. It is a further specific objective to provide a cutting machine capable of creating a tunnel with a variable cross sectional area within a maximum and a minimum cutting range. It is a further specific objective to provide a cutting (excavator) machine operable in an 'undercutting' mode according to a two stage cutting action.

The objective is achieved by providing a device for the installation of rock bolts, comprising a support structure and first and second bolting units mounted to the support structure. Each of the bolting units is configured for drilling an installation hole and/or for installing a rock bolt into a rock face. The supporting structure is configured for rotatably moving the first and second bolting units about a common axis of rotation. At least one actuator is mounted to the supporting structure and configured for additionally moving at least one of the first and second bolting units.

Since the first and second bolting units are mounted to the supporting structure that is configured for rotatably moving the first and second bolting units about a common axis of rotation, the first and second bolting units can be roughly aligned to a desired orientation. The common axis of rotation of the first and second bolting units usually corresponds to or extends parallel to a horizontal central middle axis of the tunnel. When the first and second bolting units are arranged parallel and adjacent to each other, the common axis of rotation generally extends between the first and second bolting units. Therefore, a radial orientation of the bolting units to the horizontal central middle axis of the tunnel cannot be obtained by simultaneously rotating the first and second bolting units about the common axis of rotation. However, a radial orientation of the bolting units to the horizontal central middle axis of the tunnel is desired to maximize the effective anchor length of the rock bolts to be installed. In order to allow for a radial orientation of at least one of the first and second bolting units to the horizontal central middle axis of the tunnel, at least one actuator can be used to adapt the orientation and/or position of at least one of the first and second bolting units after the first and second bolting units have been rotated simultaneously about the common axis of rotation.

It is preferred that each of the bolting units is configured for moving a rock bolt into an installation hole within the rock face. Alternatively, each of the bolting units is configured for moving a self-drilling bolt within the rock face without the need of a separate installation hole or to just drill a drill hole for degasing without installation of a rock bolt.

It is further preferred, that the first and second bolting units comprise a drilling machine for drilling installation holes into the rock face before the rock bolts are installed into the installation holes.

In an advantageous embodiment of the device according to the invention a first actuator is configured for additionally moving the first bolting unit. A second actuator is mounted to the supporting structure and configured for additionally moving the second bolting unit. By using separate actuators for additionally moving the first and second bolting units, the orientation and position of both bolting units can be adapted independently after their simultaneous rotation about the common axis of rotation took place.

Preferably, the first actuator of the device according to the invention is configured for rotatably moving the first bolting unit about a first tilting axis. Further, it is preferred that the second actuator is configured for rotatably moving the second bolting unit about a second tilting axis.

In a preferred embodiment of the device according to the invention the first tilting axis is parallel to the common axis of rotation. Alternatively or additionally, the second tilting axis is parallel to the common axis of rotation. Due to this configuration the first and second bolting units can be brought into a desired orientation within a common plane extending perpendicular to the horizontal central middle axis of the tunnel. In a first step the first and second bolting units are simultaneously rotated about the common axis of rotation in order to achieve a first rough alignment of the first and second bolting units. In a second step, the first bolting unit is rotatably moved by the first actuator about the first tilting axis, which is parallel and spaced to the common axis of rotation. Also, the second bolting unit is rotatably moved by the second actuator about the second tilting axis, which is parallel and spaced to the common axis of rotation.

Preferably, the device according to the invention comprises a third actuator that is mounted to the supporting structure. The third actuator is configured for rotatably moving the first bolting unit about a first pivot axis. Therefore, the orientation of the first bolting unit can be adjusted by a primary rotational movement together with the second bolting unit about a common axis of rotation, a secondary rotational movement, namely a rotation about the first tilting axis, and a tertiary rotational movement, namely a rotation about a first pivot axis.

Preferably, the device according to the invention comprises a fourth actuator that is mounted to the supporting structure. The fourth actuator is configured for rotatably moving the second bolting unit about a second pivot axis. Therefore, the orientation of the second bolting unit can be adjusted by a primary rotational movement together with the first bolting unit about the common axis of rotation, a secondary rotational movement, namely a rotation about the second tilting axis, and a tertiary rotational movement, namely a rotation about the second pivot axis.

In an advantageous embodiment of the device according to the invention the first pivot axis is perpendicular to the common axis of rotation. Alternatively or additionally the second pivot axis is perpendicular to the common axis of rotation.

By rotating the first and second bolting units about the first and second pivot axes, the bolt spacing in the machine direction can be adjusted independently from cutting cycle distance of the cutting apparatus on which the device is mounted.

Preferably, the first actuator, the second actuator, the third actuator and/or the fourth actuator comprises linear actuator, preferably a hydraulic cylinder. By means of a hydraulic cylinder and a suitable transition between the hydraulic cylinder and the first or second bolting unit a precise adjustment of the orientation of the first and second bolting units can be obtained. It is preferred, that the first actuator, the second actuator, the third actuator and the fourth actuator are of the same configuration using the same type of hydraulic cylinder. This leads to a simplified construction and reduced costs.

Preferably, the device according to the invention comprises a swivel motor or cylinder for rotatably moving the first and second bolting units about the common axis of rotation. It is preferred that the cylinder is a hydraulic cylinder. The swivel motor or cylinder is able to handle the turning torque necessary to rotatably move the first and second bolting units together with at least parts of the supporting structure about the common axis of rotation.

In another preferred embodiment of the device according to the invention a gear unit connects the swivel motor or cylinder and the supporting structure. In case the device comprises a swivel motor for rotatably moving the first and second bolting units together with the supporting structure about the common axis of rotation the gear unit preferably has a gear ratio in the range 0.5 to 2. Further, it is preferred that the gear ratio of the gear unit is approximately 1 or approximately 2.

Preferably, a linear actuator is mounted to the supporting structure and configured for linearly moving the supporting structure along a linear axis. Due to the possibility to linearly move the supporting structure together with the first and second bolting units not only a rotational adjustment of the first and second bolting units can take place, but also an adaption of their position with respect to the linear axis. It is preferred, that the linear axis, in which the linear actuator moves the supporting structure, is parallel to the horizontal middle axis of the tunnel.

According to a further aspect of the present invention a cutting apparatus suitable for creating tunnels and subterranean roadways and the like is provided. The cutting apparatus according to the invention comprises a drive unit for moving the cutting apparatus in a machine direction, a cutting arm configured for pivotal movement around at least one axis, a cutting head mounted to the cutting arm, the cutting head comprising at least one rotatable cutting element for detaching material from a rock face and a device for the installation of rock bolts according to one of the preceding embodiments.

Preferably, the common axis of rotation of the device for the installation of rock bolts is parallel to the machine direction of the cutting apparatus.

In another preferred embodiment of the cutting apparatus according to the invention the first tilting axis, the second tilting axis and/or the linear axis is parallel to the machine direction and/or the first pivot axis and/or the second pivot axis is perpendicular to the machine direction.

The further objectives are achieved by providing a cutting apparatus having a plurality of rotatably mounted cutting heads that may be pivoted in an upward and downward direction and a lateral side-to-side direction via a plurality of independently pivoting booms mounted at a main frame. In particular, each boom comprises a support pivotally mounted to the main frame and carrying an arm via a respective additional pivot mounting such that each cutting head is capable of pivoting about two pivoting axes. The desired range of movement of each head is provided as the dual pivoting axes are aligned transverse (including perpendicular) to one another and are spaced apart in the longitudinal direction of the apparatus between a forward and rearward end.

Advantageously, the cutting heads comprise a plurality of disc-like roller cutters distributed circumferentially around a perimeter of each head so as to create a groove or channel into the rock face as the heads are driven about their respective rotational axes. The heads may then be raised vertically so as to overcome the relatively low tensile strength of the overhanging rock to provide breakage via force and energy that is appreciably lower than a more common compressive cutting action provided by cutting picks and the like.

According to a further aspect of the present invention there is provided cutting apparatus suitable for creating tunnels or subterranean roadways and the like comprising: a main frame having generally upward, downward and side facing regions; a first and second support pivotally mounted relative to the main frame via respective first and second support axes aligned generally upright relative to the upward and downward facing regions such that each first and second support is configured to pivot laterally in a sideways direction relative to the side facing regions; at least one first and second support actuator to respectively actuate independently movement of each of the first and second supports relative to the main frame; a first and second arm each pivotally mounted to the respective first and second support via a respective arm pivot axis aligned in a direction extending transverse including perpendicular to each support pivot axis to enable the first and second arms to pivot independently of one another and to pivot relative to each of the respective first and second supports in an upward and downward direction relative to the upward and downward facing regions; at least one first and second arm actuator to actuate independently pivoting movement of the first and second arms relatives to each of the respective first and second support; a rotatable cutting head mounted at each of the first and second arms, each head rotatable about a head axis orientated to extend substantially transverse to each respective arm pivot axis.

Reference within this specification to each head being rotatable about a head axis orientated to extend substantially transverse to each respective arm pivot axis includes (or encompasses) a perpendicular alignment. Such a reference also encompasses the respective pivot axes intersecting or more preferably not intersecting with the rotational axes of the cutting heads. Optionally, the rotational axes of the cutting heads are positioned generally in front of and/or above the respective pivot axes of the pivot arms.

Optionally, each cutting head comprises a generally annular cutting edge or layered cutting edges to provide an undercutting mode of operation. The configuration of each head to provide the undercutting action is advantageous to break the rock with less force and in turn provide a more efficient cutting operation that draws less power.

Preferably, the apparatus comprises a plurality of roller cutters independently rotatably mounted at each rotatable cutting head. Preferably, the roller cutters are generally annular roller cutters each having a generally annular cutting edge or layered cutting edges to provide an undercutting mode of operation. More preferably, the roller cutters are mounted at a perimeter region of each cutting head such that the roller cutters circumferentially surround each cutting head. Such a configuration is advantageous to provide the undercutting action of the apparatus with the roller cutters first creating a channel or groove extending generally horizontally in the rock face. The roller cutters may then be moved upwardly to break the rock by overcoming the tensile forces immediately above the channel or groove. A more efficient cutting operation is provided requiring less force and drawing less power. Preferably, the roller cutters are mounted at generally cylindrical bodies and comprise generally annular cutting edges distributed around the perimeter of the cutting head. Each generally circular cutting edge is accordingly positioned side-by-side around the circumference of the cutting head with each cutting edge representing an endmost part of each pivoting arm. Preferably an alignment of the rotational axes of the roller cutters relative to the rotational axis of the respective cutting head is the same so that the respective cutting edges are all orientated in the same position around the cutting head.

Preferably, each of the first and second arm actuator comprises a planetary gear assembly mounted at the junction at which each arm pivots relative to each support. The subject invention may comprise a conventional planetary gear arrangement such as a Wolfram type planetary gear having a high gear ratio. The planetary gear assembly is mounted internally with each arm such that the cutting apparatus is designed to be as compact as possible. Preferably, the apparatus further comprises at least one first drive motor to drive the pivoting movement of the first and/or second arm relative to the respective first and second support and the main frame. Preferably, the apparatus comprises two drive motors to drive each of the first and second arms about their pivoting axis via the respective planetary gears. Preferably, the respective drive motors are mounted in-board of each arm and are coupled to each arm via the planetary gear assembly and/or an intermediate drive transmission.

Preferably, the apparatus further comprises at least one second drive motor to drive rotation of the cutting head at the first and/or the second arm. Preferably, each head comprises two drive motors mounted at the side of each arm. Such an arrangement is advantageous to pivot each drive motor with each cutting head and to provide a direct drive with minimal intermediate gearing.

Optionally, the first and second support actuator comprises a hydraulic linear actuator. Preferably, each support actuator comprises a linear hydraulic cylinder positioned at the lateral sides of the sled and coupled to extend between the sled and an actuating flange extending laterally outward from each support. Such an arrangement is advantageous to minimise the overall width of the apparatus whilst providing an efficient mechanism for the sideways lateral slewing of each support and accordingly each arm.

Optionally, the sled may be positioned to operate longitudinally between the supports and each of the respective arms. That is, each arm may be configured to slide in the axially forward direction relative to each support via one or a plurality of actuators. Optionally, each arm is connected to each support via a respective sliding actuator such that each arm is configured to slide independently relative to one another. Optionally, each arm may be configured to slide in a forward and rearward direction relative to each support via a coordinated parallel sliding mechanism.

Preferably, the apparatus further comprises a powered sled movably mounted at the main frame to be configured to slide in a forward cutting direction of the apparatus relative to the main frame. The apparatus may further comprise a plurality of 'runners' or guide rails to minimise the frictional sliding movement of the sled over the main frame. Preferably, the apparatus comprises at least one powered linear actuator to provide the forward and rearward movement of the sled relative to the main frame. As will be appreciated, the sled may be configured to move axially/longitudinally at the machine via a plurality of different actuating mechanisms including rack and pinion arrangements, belt drive arrangements, gear arrangements and the like. Preferably the supports and the arms are mounted at the sled and are all configured to move in the forward and rearward direction collectively.

Optionally, each of the first and second arms is configured to pivot in the upward and downward direction by up to 180°. Optionally, each arm may be configured to pivot over a range of up to 155°. Optionally, the first and second supports are configured to pivot in the lateral sideways direction by up to 90°. Optionally, the supports may be configured to pivot up to 20° in the lateral sideways direction. Such a configuration provides control of the profile shape and avoids any cuts or ridge that would otherwise remain on the roof and floor of the as-formed tunnel.

Preferably, the apparatus comprises tracks or wheels mounted at the main frame to allow the apparatus to move in a forward and rearward direction. The tracks or wheels enable the apparatus to be advanced forwardly and rearwardly within the tunnel both when manoeuvred into and from the cutting face between cutting operations and to be advanced forwardly during cutting operations as part of the cut-and-advance cutting cycle that also utilises the sliding sled.

Preferably, the apparatus further comprises floor and roof engaging members mounted at the main frame, at least the floor engaging members being extendable and retractable to respectively raise and lower the apparatus in the upward and downward direction. The engaging members are configured to wedge the apparatus in position between the roof and floor of the tunnel to provide points of anchorage against which the machine may be braced to allow the cutters to be forced against the rock face.

Preferably, the apparatus further comprises a first material discharge conveyor to convey cut material rearwardly from the first and second cutting head; and a gathering head to direct cut material onto the conveyor, the gathering head positioned rearwardly behind at least one of the first and second cutting heads. The apparatus is accordingly configured to transport rearwardly material from the cut face to provide unhindered forward cutting movement into the rock.

Preferably, the apparatus further comprises a control unit demountably connectable to the apparatus, the control unit comprising operational components to power at least the first and second support and arm actuators, the control unit further comprising a second conveyor to receive material from the first conveyor and to discharge the material at a position rearward of the apparatus and the control unit. Preferably, the control unit is demountably coupled to the apparatus so as to be capable of being advanced and retracted in the forward and rearward directions with the cutting apparatus. Preferably, the control unit is suspended above the tunnel floor by suitable couplings to the apparatus. The control unit may comprise ground engaging support members provided at a rearward and/or forward regions. Optionally, the control unit may be attachable at its rearward end to a material collection and discharge vehicle and to be connectable at its forward end to the cutting apparatus.

According to a further aspect of the present invention there is provided cutting apparatus suitable for creating tunnels or subterranean roadways and the like comprising: a main frame having generally upward, downward and side facing regions; a powered sled movably mounted at the main frame to be configured to slide in a forward cutting direction of the apparatus relative to the main frame; a first and second arm pivotally coupled or mounted to the sled by respective pivot arm axes aligned in a direction extending transverse including perpendicular to a longitudinal axis of the main frame to allow each arm to pivot independently of one another in an upward and downward direction relative to the upward and downward facing region of the main frame; at least one first and second arm actuator to actuate independent pivoting movement of the first and second arms relative to one another and the main frame; a rotatable cutting head mounted at each of the first and second arms so as to be configured to be moved in the upward and downward direction and advanced in the forward cutting direction, each head rotatable about a head axis orientated to extend substantially transverse to respective pivot arm axes.

Optionally, the first and second arm together with the respective pivot arm axes are respectively coupled or mounted to the sled via a first and second support, the first and second supports are slidably mounted relative to the sled via a common or respective slidable means such that each first and second support is configured to slide laterally in a sideways direction relative to the side facing regions. The first and second supports are mounted at the sled and configured to slide laterally cross the sled substantially perpendicular to the forward and backward sliding movement of the sled relative to the main frame.

Optionally, each rotatable cutting head comprises a generally annular roller cutter each having a generally annular cutting edge or layered cutting edges to provide an undercutting mode of operation.

Preferably, the apparatus further comprises a plurality of roller cutters independently rotatably mounted at each rotatable cutting head. Optionally, the plurality of roller cutters is generally annular roller cutters each having a generally annular cutting edge or layered cutting edges to provide an undercutting mode of operation.

According to a further aspect of the present invention there is provided cutting apparatus configured to create a cutting profile via an undercutting operation to create tunnels and subterranean roadways, the apparatus comprising: a main frame; a first and second arm pivotally mounted to the main frame by respective pivot arm axes aligned in a direction extending transverse including perpendicular to a longitudinal axis of the main frame to allow each arm to pivot independently of one another in an upward and downward direction relative to an upward and downward facing region of the main frame; at least one first and second arm actuator to actuate independent pivoting movement of the first and second arms relative to one another and the main frame; a rotatable cutting head mounted at each of the first and second arms, each cutting head comprising generally annular roller cutters each having a generally annular cutting edge to provide an undercutting mode of operation.

Preferably, the apparatus comprises a first and second support pivotally mounted relative to the main frame via respective first and second support axes aligned generally upright relative to the upward and downward facing regions such that each first and second support is configured to pivot laterally in a sideways direction relative to the side facing regions.

Preferably, the apparatus further comprises a powered sled movably mounted at the main frame, the first and second arms mounted at the sled so as to be capable of longitudinal reciprocating movement to slide in a forward cutting direction of the apparatus to engage the roller cutters into the rock face.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Figure 1:
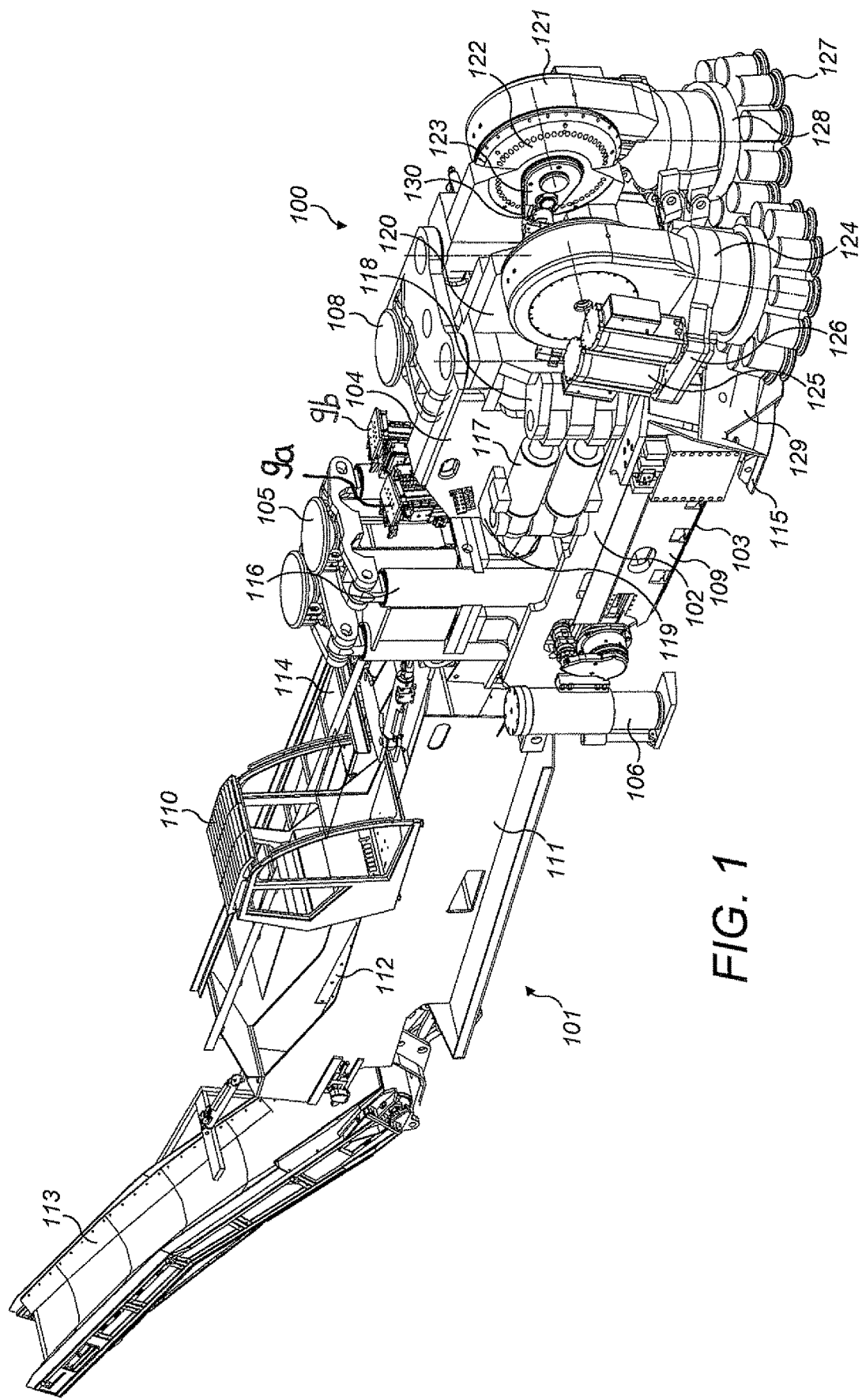
FIG. 1 is a front perspective view of a mobile cutting apparatus suitable for creating tunnels or subterranean roadways having a forward mounted cutting unit and a rearward control unit according to a specific implementation of the present invention.

Referring to FIG. 1, cutting apparatus 100 comprises a main frame 102 mounting a plurality of cutting components configured to cut into a rock or mineral face to create tunnels or subterranean roadways. Apparatus 100 is configured specifically for operation in an undercutting mode in which a plurality of rotatable roller cutters 127 may be forced into the rock to create a groove or channel and then to be pivoted vertically upward so as to overcome the reduced tensile force immediately above the groove or channel and break the rock. Accordingly, the present cutting apparatus is optimised for forward advancement into the rock or mineral utilising less force and energy typically required for conventional compression type cutters that utilise cutting bits or picks mounted at rotatable heads. However, the present apparatus may be configured with different types of cutting head to those described herein including in particular pick or bit type cutting heads in which each pick is angularly orientated at the cutting head to provide a predetermined cutting attack angle.

Figure 2:
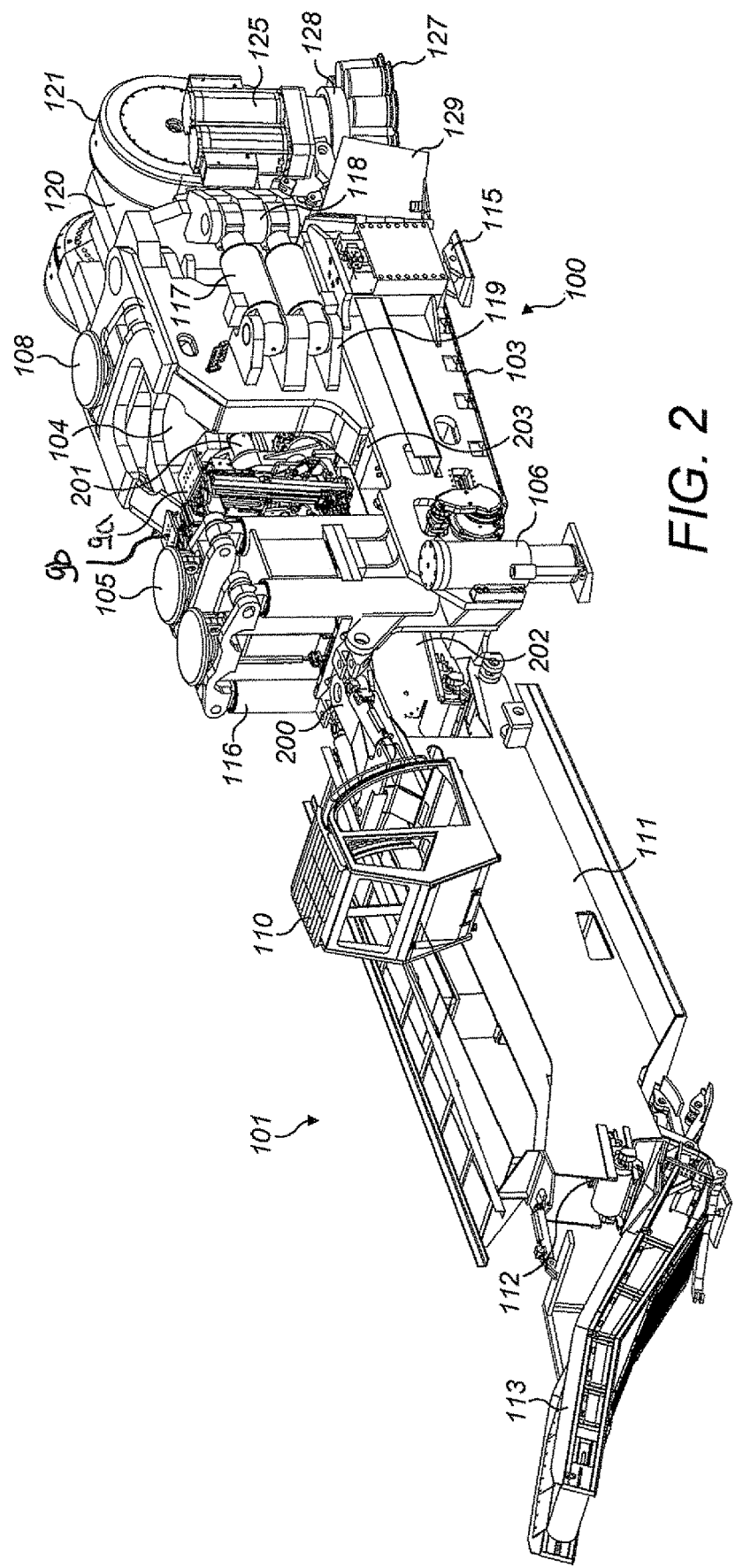
FIG. 2 is a rear perspective view of the cutting apparatus of FIG. 1.
Figure 3:
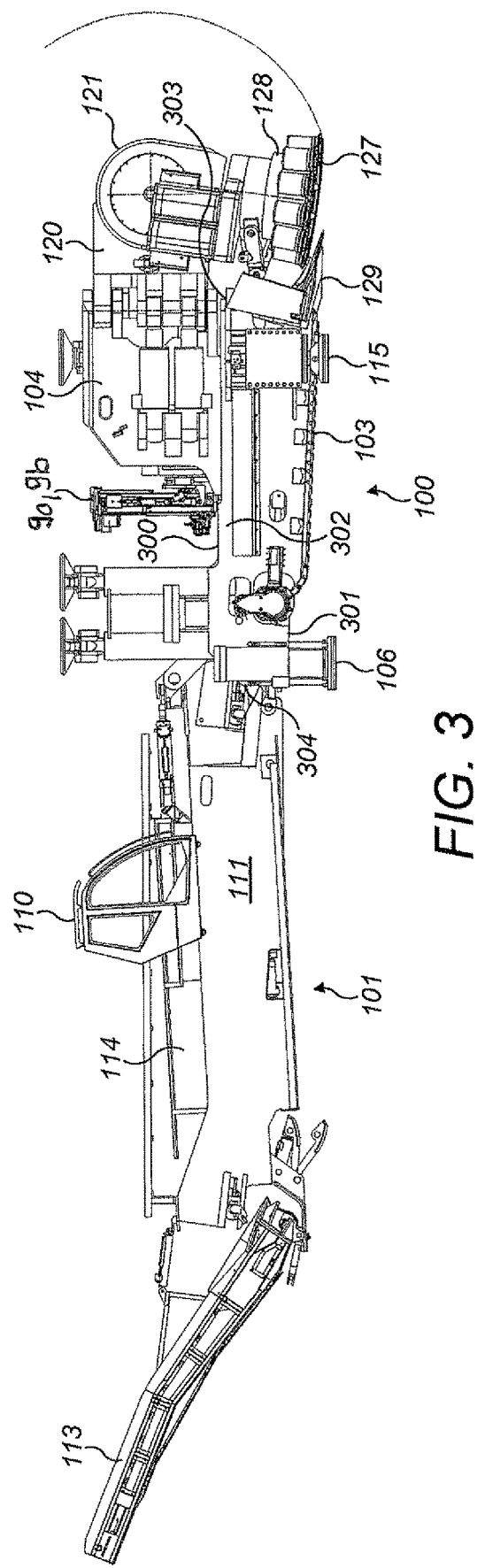
FIG. 3 is a side elevation view of the apparatus of FIG. 2.

Referring to FIGS. 1 to 3, main frame 102 comprises lateral sides 302 to be orientated towards the wall of the tunnel; an upward facing region 300 to be orientated towards a roof of the tunnel; a downward facing region 301 orientated to be facing the floor of the tunnel; a forward facing end 303 intended to be positioned facing the cutting face and a rearward facing end 304 intended to be positioned facing away from the cutting face.

An undercarriage 109 is mounted generally below main frame 102 and in turn mounts a pair of crawler tracks 103 driven by a hydraulic (or electric) motor to provide forward and rearward movement of apparatus 100 over the ground when in a non-cutting mode. A pair of rear ground engaging jacking legs 106 is mounted at frame sides 302 towards rearward end 304 and is configured to extend and retract linearly relative to frame 102. Frame 102 further comprises a forward pair of jacking legs 115 also mounted at each frame side 302 and towards forward end 303 and being configured to extend and retract to engage the floor tunnel. By actuation of legs 106, 115, main frame 102 and in particular tracks 103 may be raised and lowered in the upward and downward direction so as to suspend tracks 103 off the ground to position apparatus 100 in a cutting mode. A pair of roof engaging grippers 105 project upwardly from main frame 102 at frame rearward end 304 and are extendable and retractable linearly in the upward and downward direction via control cylinders 116. Grippers 105 are therefore configured to be raised into contact with the tunnel roof and in extendable combination with jacking legs 106, 115 are configured to wedge apparatus 100 in a stationary position between the tunnel floor and roof when in the cutting mode.

A sled 104 is slidably mounted on top of main frame 102 via a slide mechanism 203. Sled 104 is coupled to a linear hydraulic cylinder 201 such that by reciprocating extension and retraction of cylinder 201, sled 104 is configured slide linearly between frame forward and rearward ends 303, 304.

A pair of hydraulically actuated bolting units 9a, 9b is mounted at main frame 102 between sled 104 and roof gripping unit 105, 116 relative to a lengthwise direction of the apparatus. Bolting units 9a, 9b are configured to secure a mesh structure (not shown) to the roof of the tunnel as apparatus 100 is advanced in a forward cutting direction. Apparatus 100 also comprises a mesh support structure (not shown) mounted generally above sled 104 so as to positionally support the mesh directly below the roof prior to bolting into position.

Figure 5:
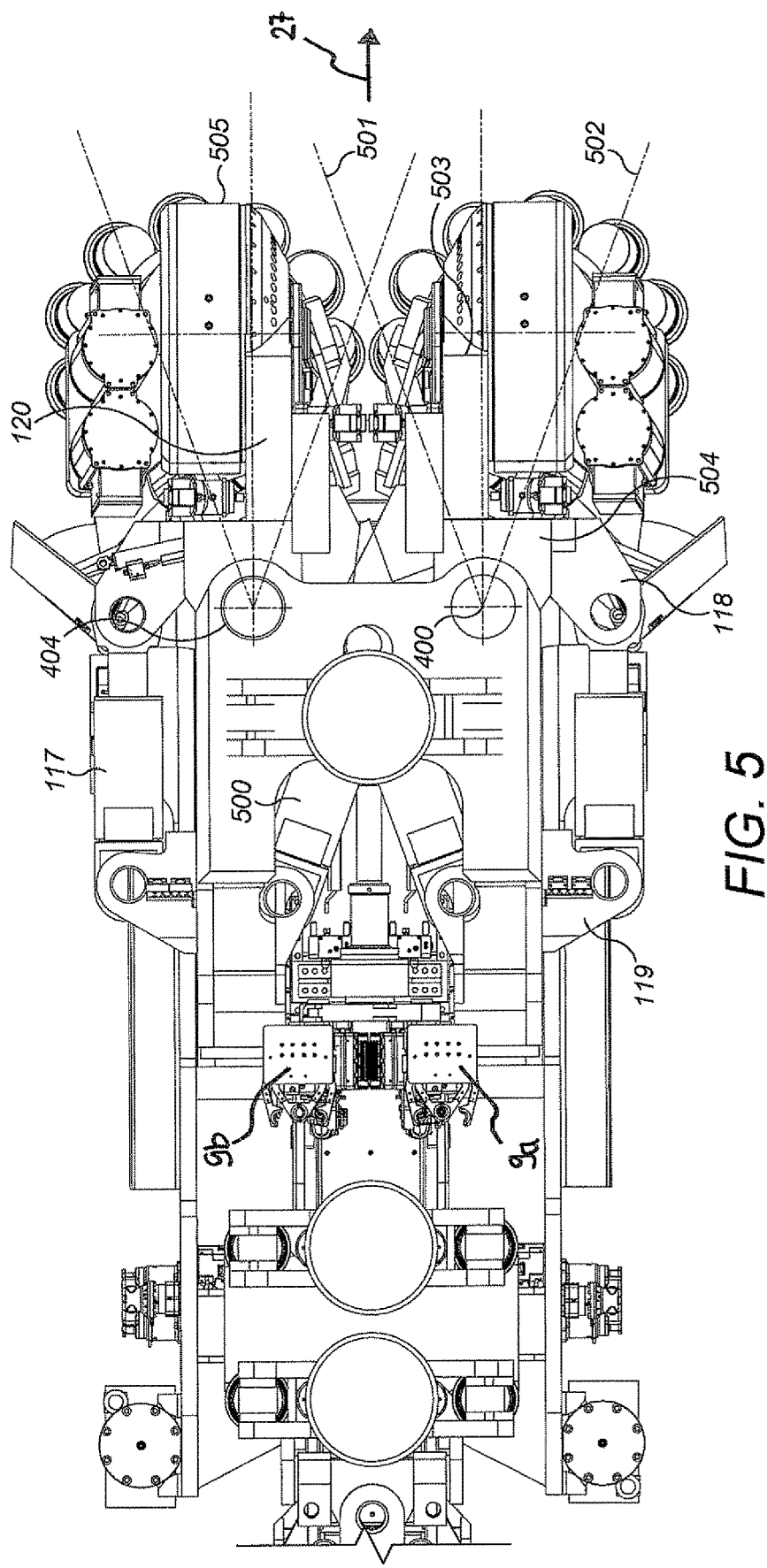
FIG. 5 is a plan view of the cutting apparatus of FIG. 4.

A pair of supports 120 are pivotally mounted at and project forwardly from sled 104 immediately above frame forward end 303. Supports 120 are generally spaced apart in a lateral widthwise direction of the apparatus 100 and are configured to independently pivot laterally outward from one another relative to sled 104 and main frame 102. Each support 120 comprises a forward end 503 and a rearward end 504 referring to FIG. 5. A first mount flange 118 is provided at support rearward end 504 being generally rearward facing. A corresponding second mount flange 119 projects laterally outward from a side of sled 104 immediately behind the first flange 118. A pair of linear hydraulic cylinders 117 is mounted to extend between flanges 118, 119 such that by linear extension and retraction, each support 120 is configured to pivot in the generally horizontal plane and in the lateral sideways direction relative to frame sides 302. Referring to figured 4, each support 120 is mounted at sled 104 via a pivot rod 404 extending generally vertically (when apparatus 100 is positioned on horizontal ground) through sled 104 and being suspended generally above the main frame forward end 303. Each support 120 is therefore configured to pivot or slew about pivot axis 400. Referring to FIG. 5, each support 120 is further coupled to a respective inner hydraulic cylinder 500 mounted at an inner region of sled 104 to cooperate with side mounted cylinders 117 to laterally slew each support 120 about pivot axis 400.

Figure 4:
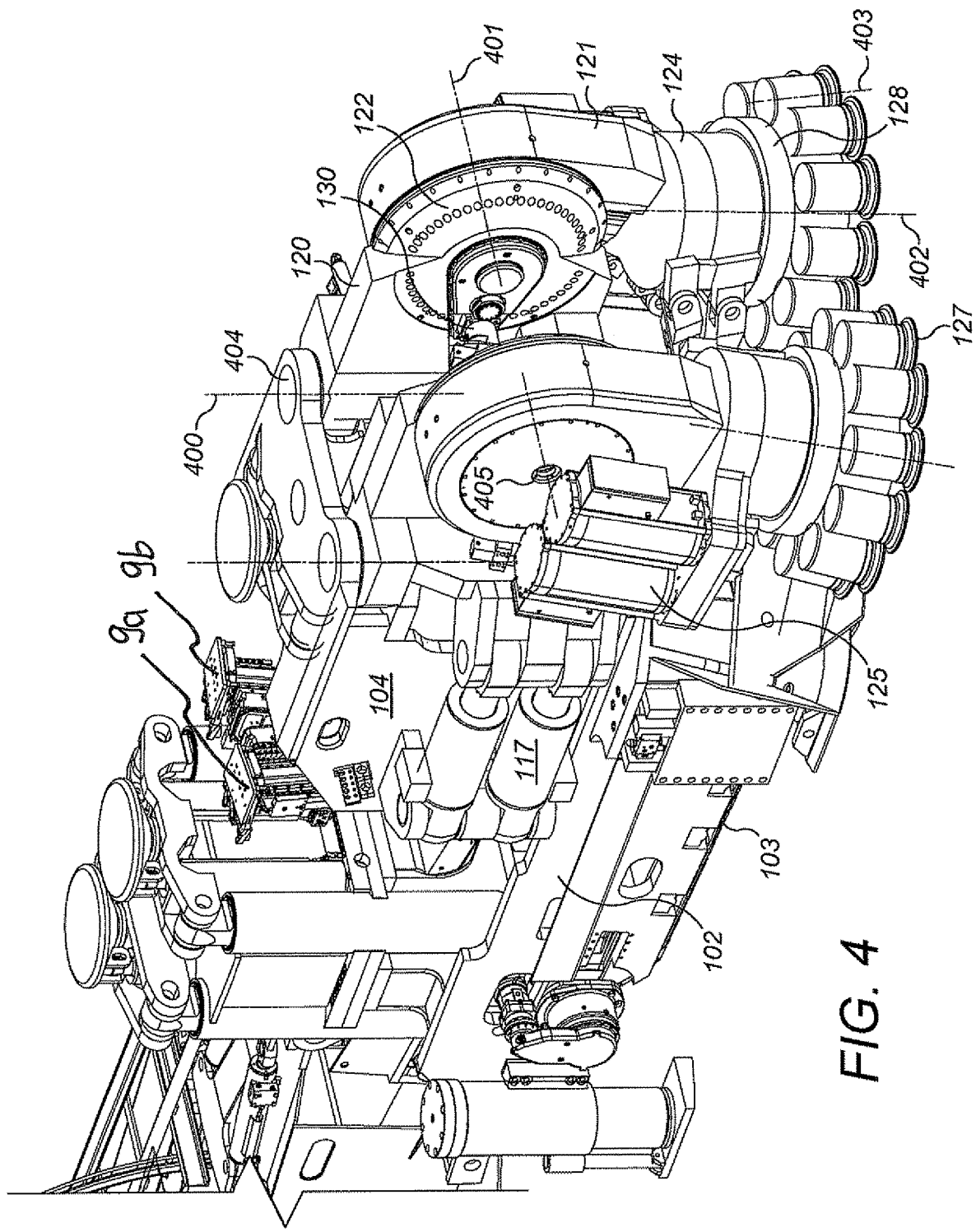
FIG. 4 is a magnified front perspective view of the cutting unit of the apparatus of FIG. 3.

Referring to FIGS. 4 and 5, as the respective pivot axes 400 are space apart in the widthwise direction of apparatus 100, supports 120 are capable of being slewed inwardly to a maximum inward position 501 and to be slewed laterally outward to a maximum outward position 502. According to the specific implementation, an angle between the inner and outer slewing positions 501, 502 is 20°.

Figure 7:
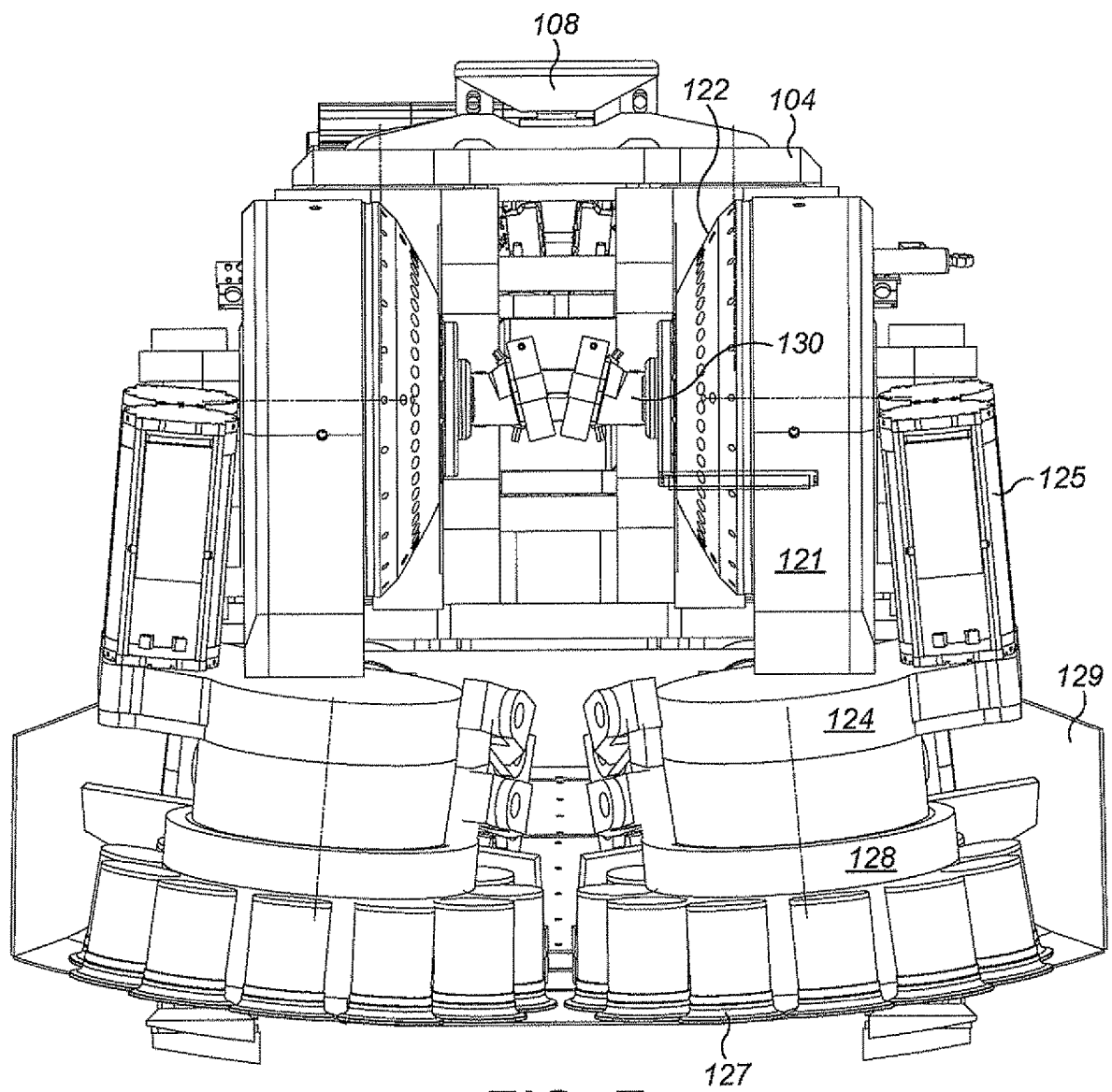
FIG. 7 is a front end view of the cutting apparatus of FIG. 6.

Referring to FIGS. 1 to 3, an arm 121 is pivotally mounted generally at the forward end 503 of each support 120. Each arm 121 comprises a cutting head 128 rotatably mounted at a distal end. Each cutting head 128 comprises a disk like (generally cylindrical) configuration. The plurality of generally annular or disc shaped roller cutters 127 are mounted at the circumferential perimeter of each head 128 and comprise a sharp annular cutting edge configured specifically for undercutting the rock. Cutters 127 are rotatably mounted independently relative to one another and head 128 and are generally free to rotate about their own axis. Each roller cutter 127 projects axially beyond a forwardmost annular edge of head 128 such that when arms 121 are orientated to be extending generally downward, roller cutters 127 represent a lowermost part of the entire head 128 and arm 121 assembly. Each arm 121 may be considered to comprise a length such that arm 121 is mounted at each respective support 120 at or towards a proximal arm end and to mount each head 128 at a distal arm end. In particular, each arm 121 comprises an internally mounted planetary gear indicated generally be reference 122. Each gear 122 is preferably a Wolfrom type and is coupled to a drive motor 130 via a drive train indicated generally by reference 123. A pair of drive motors 125 is mounted at the lateral sides of each arm 121 and is orientated to be approximately parallel with the rotational axis of each respective cutting head 128 as shown in FIG. 7. Each arm 121 further comprise an internal drive and gear assembly 124 coupled to a gear box 126 mounted at one end of each of the drive motors 125. Each cutting head 128 is driveably coupled to the drive motors 125 via the respective gear assembly 124 to provide rotation of cutting head 128 about axis 402.

Figure 6:
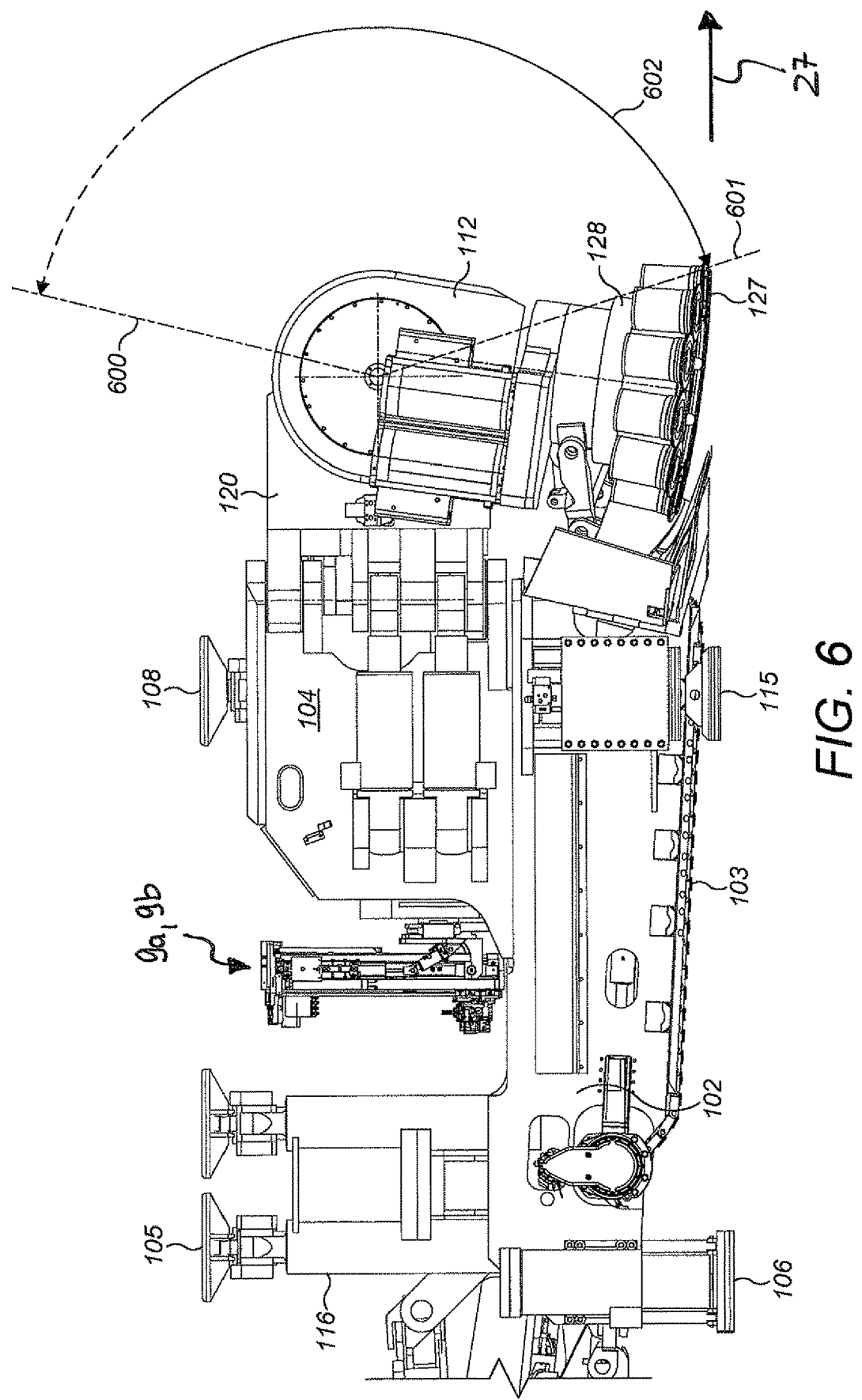
FIG. 6 is a side elevation view of the cutting apparatus of FIG. 5.

According to the specific implementation, and as shown in FIG. 7, each arm 121 is coupled to a respective motor 130 mounted at a forward end of sled 104. Each planetary gear 122 is centred on a pivot rod 405 having a pivot axis 401 referring to FIG. 4. Each axis 401 is aligned to be generally horizontal when apparatus 100 is positioned on horizontal ground. Accordingly, each arm 121 is configured to pivot (relative to each support 120, sled 104 and main frame 102) in the upward and downward direction (vertical plane) by actuation of each motor 130. As such, each cutting head 128 and in particular the roller cutters 127 may be raised and lowered along the arcuate path 602 referring to FIG. 6. In particular, each arm 121, head 128 and roller cutters 127 may be pivoted between a lowermost position 601 and an uppermost raised position 600 with an angle between positions 600, 601 being approximately 150°. When in the lowermost position 601, each roller cutter 127 and in particular head 128 is suspended in a declined orientation such that a forwardmost roller cutter 127 is positioned lower than a rearwardmost roller cutter 127. According to the specific implementation, this angle of declination is 10°. This is advantageous to engage the cutters 127 into the rock face at the desired attack angle to create the initial groove or channel during a first stage of the undercutting operation. Additionally, the extensive range of movement of the cutting heads 128 over the rock face is possible due, in part, to axis 401 being separated and positioned forward relative to axis 400 by a distance corresponding to a length of each support 120.

Referring to FIG. 4, each support pivot axis 400 is aligned generally perpendicular to each arm pivot axis 401. Additionally, a rotational axis 402 of each cutting head 128 is orientated generally perpendicular to each arm pivot axis 401. A corresponding rotational axis 403 of each roller cutter 127 is angularly disposed relative to cutting head axis 402 so as to taper outwardly in the downward direction. In particular, each roller cutter axis 403 is orientated to be aligned closer to the orientation of each cutting head rotational axis 402 and support pivot axis 400 relative to the generally perpendicular arm rotational axis 401.

Accordingly, each support 120 is configured to slew laterally outward in a horizontal plane about each support axis 400 between the extreme inner and positions 501, 502. Additionally and referring to FIG. 6, each respective arm 121 is configured to pivot in the upward and downward direction about arm pivot axis 401 to raise and lower the roller cutters 127 between the extreme positions 600, 601.

A gathering head 129 is mounted at main frame forward end 303 immediately rearward behind each cutting head 128. Gathering head 129 comprises a conventional shape and configuration having side loading aprons and a generally inclined upward facing material contact face to receive and guide cut material rearwardly from the cutting face (and cutting heads 128). Apparatus 100 further comprises a first conveyor 202 extending lengthwise from gathering head 129 to project rearwardly from frame rearward end 304. Accordingly, material cut from the face is gathered by head 129 and transported rearwardly along apparatus 100.

Referring to FIGS. 1 to 3, a detachable control unit 101 is mounted to the frame rearward end 403 via a pivot coupling 200. Control unit 111 comprises a personnel cabin 110 (to be occupied by an operator). Unit 111 further comprises an electric and hydraulic power pack 114 to control the various hydraulic and electrical components of apparatus 100 associated with the pivoting movement of supports 120 and arms 121 in addition to the sliding movement of sled 104 and the rotational drive of cutting heads 128.

Control unit 101 further comprises a second conveyor 112 extending generally lengthwise along the unit 101 and coupled at its forwardmost end to the rearwardmost end of first conveyor 202. Unit 101 further comprises a discharge conveyor 113 projecting rearwardly from the rearward end of second conveyor 112 at an upward declined angle. Accordingly, cut material is capable of being transported rearwardly from cutting heads 128 along conveyors 202, 112 and 113 to be received by a truck or other transportation vehicle.

In use, apparatus 100 is wedged between the tunnel floor and roof via jacking legs 106, 115 and roof grippers 105. Sled 104 may then be displaced in a forward direction relative to main frame 102 to engage roller cutters 127 onto the rock face. Cutting heads 128 are rotated via motors 125 that create the initial groove or channel in the rock face at a lowermost position. A first arm 121 is then pivoted about axis 401 via motor 130 to raise roller cutters 127 along path 602 to achieve the second stage undercutting operation. The first support 120 may then be slewed in the lateral sideways direction via pivoting about axis 400 and combined with the raising and lowering rotation of roller cutters 127 creates a depression or pocket within the rock immediately forward of the first arm 121 and support 120. The second arm 121 and associated head 128 and cutters 127 are then actuated according to the operation of the first arm 121 involving pivoting in both the vertical and horizontal planes. This sequential dual pivoting movement of the second arm 121 is independent of the initial dual pivoting movement of the first arm 121. A phasing and sequencing of the pivoting of arms 121 about axes 401 and supports 120 about axes 400 is controlled via control unit 111.

When the maximum forward travel of sled 104 is achieved, jacking legs 106, 115 are retracted to engage tracks 103 onto the ground. Tracks 103 are orientated to be generally declined (at an angle of approximately 10° relative to the floor) such that when ground contact is made, the roller cutters 127 are raised vertically so as to clear the tunnel floor. The apparatus 100 may then be advanced forward via tracks 103. Jacking legs 106, 115 may then be actuated again to raise tracks 103 off the grounds and grippers 105 moved into contact with the tunnel roof to repeat the cutting cycle. A forwardmost roof gripper 108 is mounted above sled 104 to stabilise the apparatus 100 when sled 104 is advanced in the forward direction via linear actuating cylinder 201.

Figure 8:
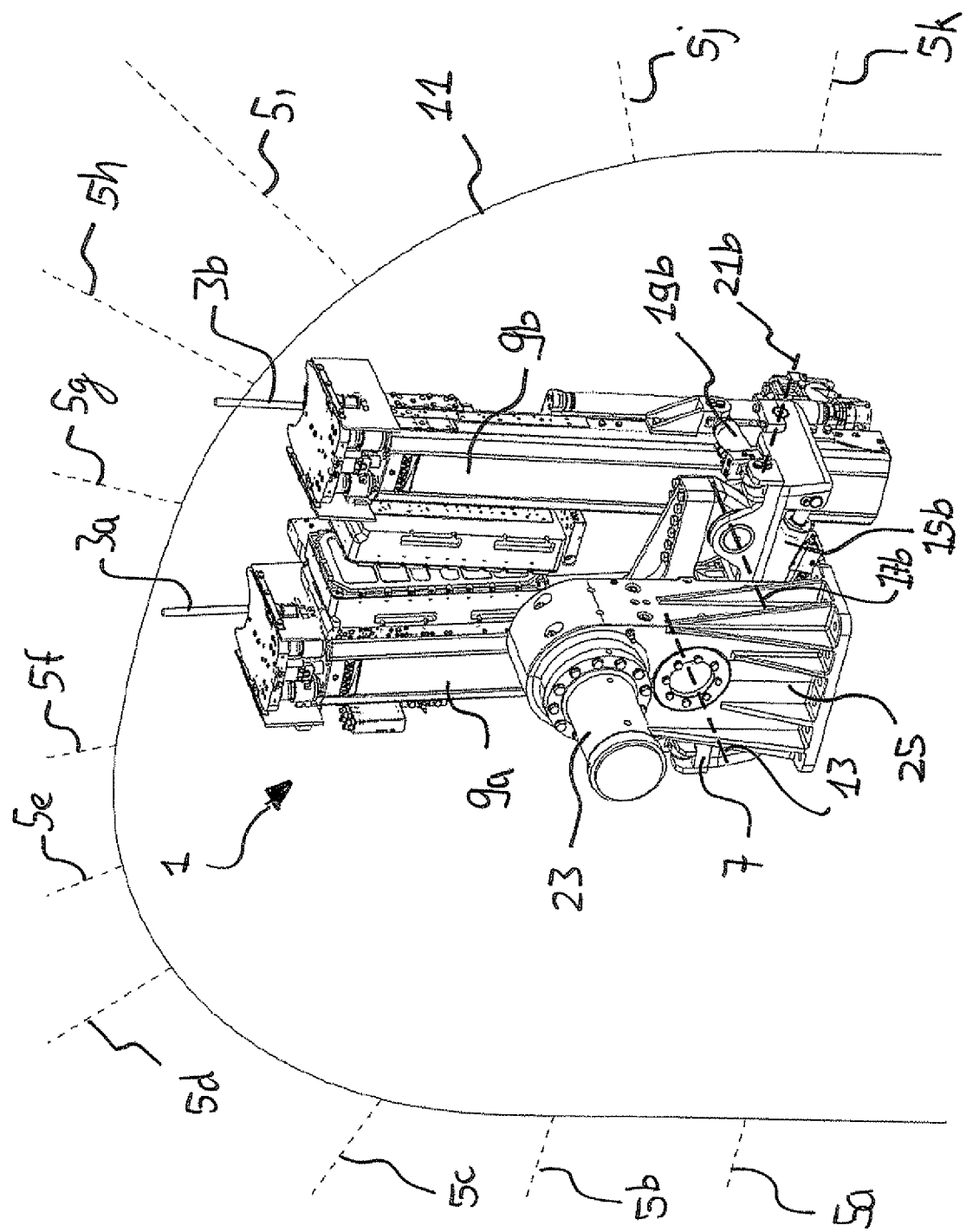
FIG. 8 is a perspective view of a device for the installation of rock bolts according to a specific implementation of the present invention.

Referring to FIG. 8, the device 1 for the installation of rock bolts 3a, 3b, comprises a supporting structure 7 and first and second bolting units 9a, 9b. The first and second bolting units 9a, 9b are mounted to the supporting structure 7, wherein each bolting unit 9a, 9b is configured for moving a rock bolt 3a, 3b into a rock face 11.

The first and second bolting units 9a, 9b are either configured for drilling a drill hole and moving a rock bolt 3a, 3b into the drilled installation hole 5a-k within the rock face 11 or for directly moving a self-drilling rock bolt 3a, 3b within the rock face 11 without the need of a separate installation hole 5a-k.

The first and second bolting units 9a, 9b may also comprise a drilling machine for drilling installation holes 5a-k into the rock face 11 before the rock bolts 3a, 3b are moved into the installation holes 5a-k.

The supporting structure 7 is configured for rotatably moving the first and second bolting units 9a, 9b about a common axis of rotation 13. By moving the first and second bolting units 9a, 9b about the common axis of rotation 13 the first and second bolting units 9a, 9b can be roughly aligned to a desired orientation. The common axis of rotation 13 corresponds to the machine direction 27 of the apparatus 100 on which the device 1 is mounted (see FIGS. 5 and 6). Further, the common axis of rotation 13 is parallel to the horizontal central middle axis of the generated tunnel.

First and second actuators 15a, 15b are mounted between first and second intermediate elements 35a, 35b and bracket 32 and configured for additionally moving the first and second bolting units 9a, 9b. The first actuator (not shown in FIG. 8) is configured for additionally moving the first bolting unit 9a and the second actuator 15b is configured for additionally moving the second bolting unit 9b.

The first actuator is configured for rotatably moving the first bolting unit 9a about a first tilting axis (not shown in FIG. 8), which is parallel to the common axis of rotation 13. The second actuator 15b is configured for rotatably moving the second bolting unit 9b about a second tilting axis 17b, which is parallel to a common axis rotation 13.

Further, third and fourth actuators 19a, 19b are mounted to the supporting structure 7 and configured for rotatably moving the first and second bolting units 9a, 9b about first and second pivot axes 21a, 21b, respectively. The first and second pivot axes 21a, 21b are perpendicular to the common axis of rotation 13.

The device 1 further comprises a swivel motor 23 for rotatably moving the first and second bolting units 9a, 9b about the common axis of rotation 13.

Figure 9:
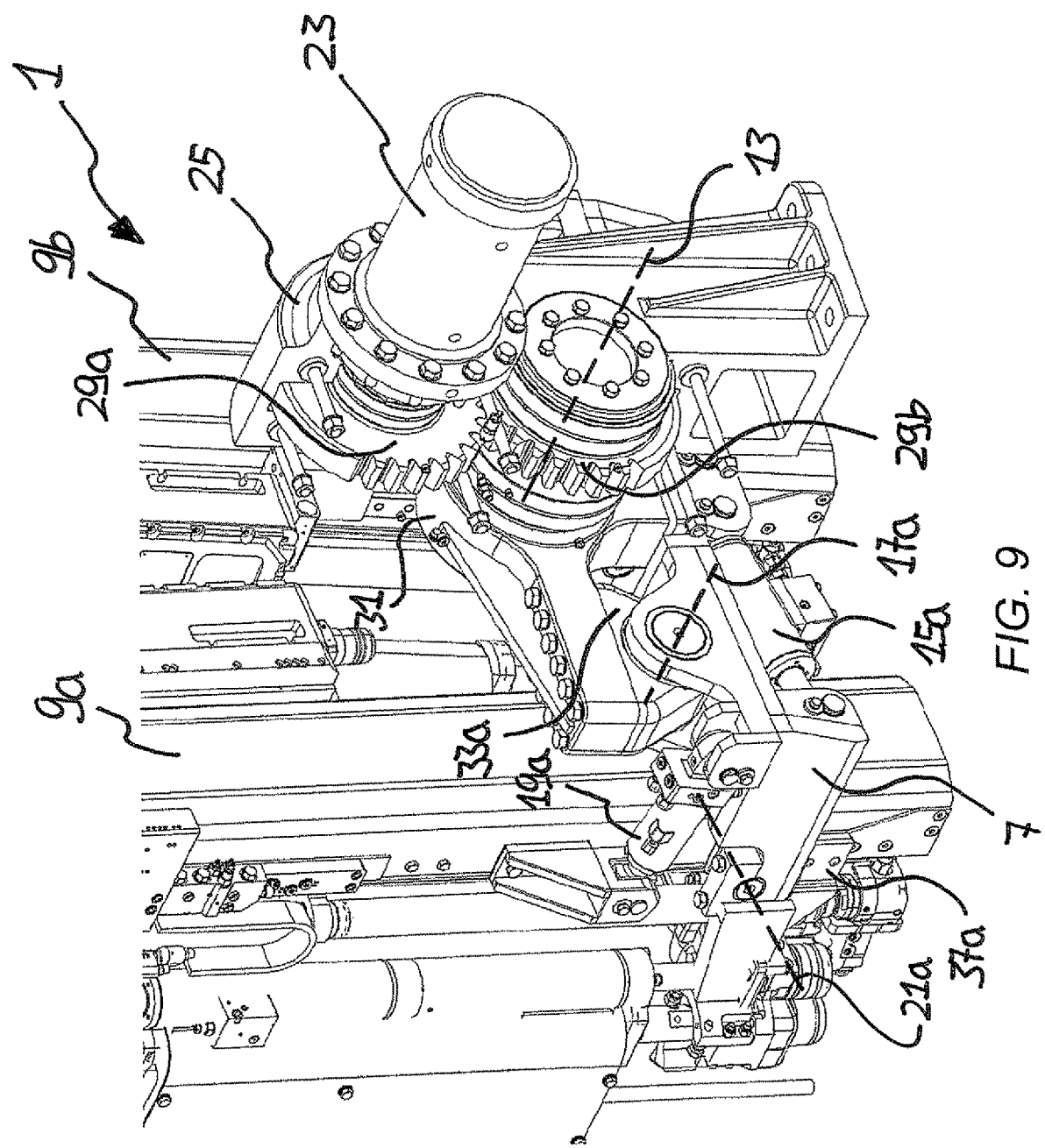
FIG. 9 is a magnified perspective view of the device of FIG. 8 without the second half of the support structure

Referring to FIG. 9, the device 1 comprises a gear unit 25 that connects the swivel motor 23 and the supporting structure 7. The gear unit 25 comprises a pair of gears 29a, 29b, wherein the gears 29a, 29b have the same diameter resulting in a gear ratio of the gear unit 25 of one.

The supporting structure 7 comprises a transition element 31, wherein the transition element 31 has two legs extending in opposite lateral directions where brackets 33a, 33b are mounted. The first intermediate element 35a is rotatably mounted to first bracket 33a. The first intermediate element 35a is rotatably movable to the first bracket 33a about the first tilting axis 17a (see also FIGS. 12 and 13). The second intermediate element 35b is rotatably mounted to second bracket 33b. The second intermediate element 35b is rotatably movable to the second bracket 33b about the first tilting axis 17a (see also FIGS. 12 and 13).

A first holding member 37a is rotatably mounted to the first intermediate element 35a. The first intermediate element 35a and the first holding member 37a are rotatably movable to each other about the first pivot axis 21a. A second holding member 37b is rotatably mounted to the second intermediate element 35b. The second intermediate element 35b and the second holding member 37b are rotatably movable to each other about the second pivot axis 21b.

The first holding member 37a is mounted to the first bolting unit 9a. The second holding member 37b is mounted to the second bolting unit 9b.

Figure 11:
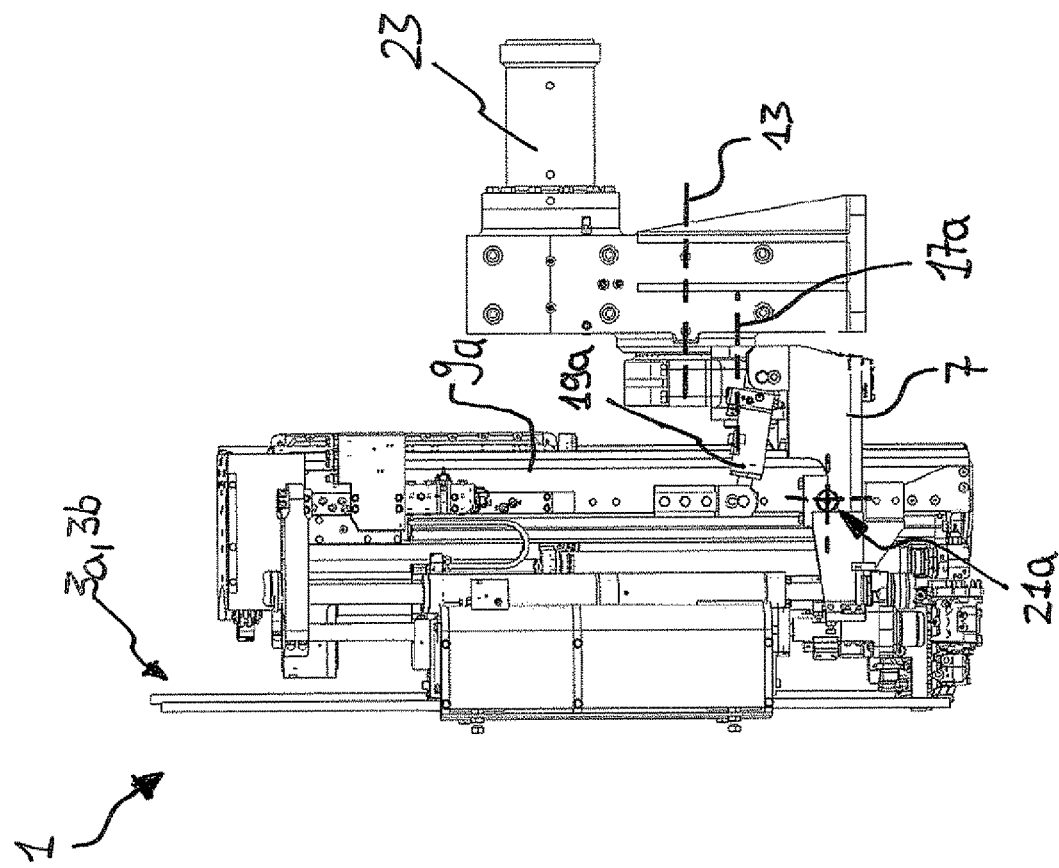
FIG. 11 is a side elevation view of the device of FIG. 8.
Figure 10:
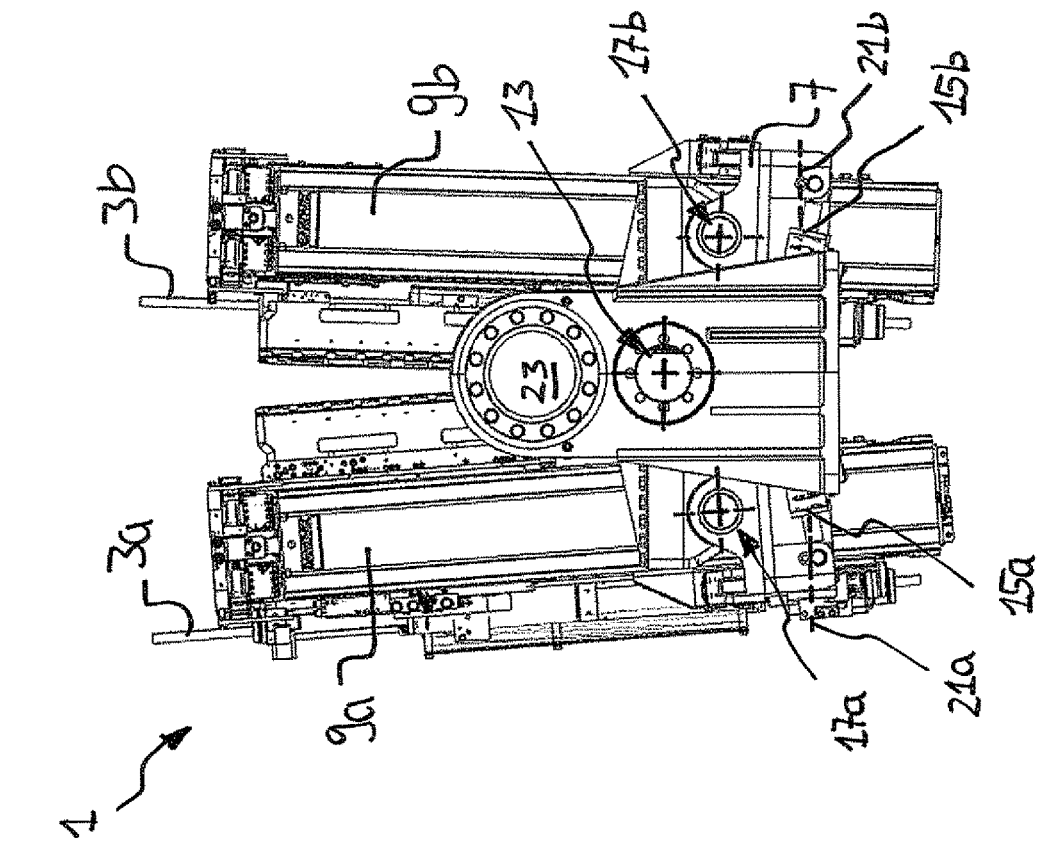
FIG. 10 is a front end view of the device of FIG. 8.

Referring to FIGS. 10 and 11, the first tilting axis 17a and the second tilting axis 17b are parallel to the common axis of rotation 13. The first pivot axis 21a and the second pivot axis 21b are perpendicular to the common axis of rotation 13.

The additional rotatability of the first and second bolting units 9a, 9b allow for a precise adjustment of the rock bolts 3a, 3b for moving them into the rock face. Thereby, the rock bolts 3a, 3b can be nearly radially aligned to the horizontal central middle axis of the tunnel, such that the effective anchor length of the rock bolts 3a, 3b is maximized. By maximizing the effective anchor length of the rock bolts 3a, 3b the total number of necessary rock bolts or the rock bolt length can be reduced. This leads to an accelerated tunnel generation and to reduced costs.

Figure 12:
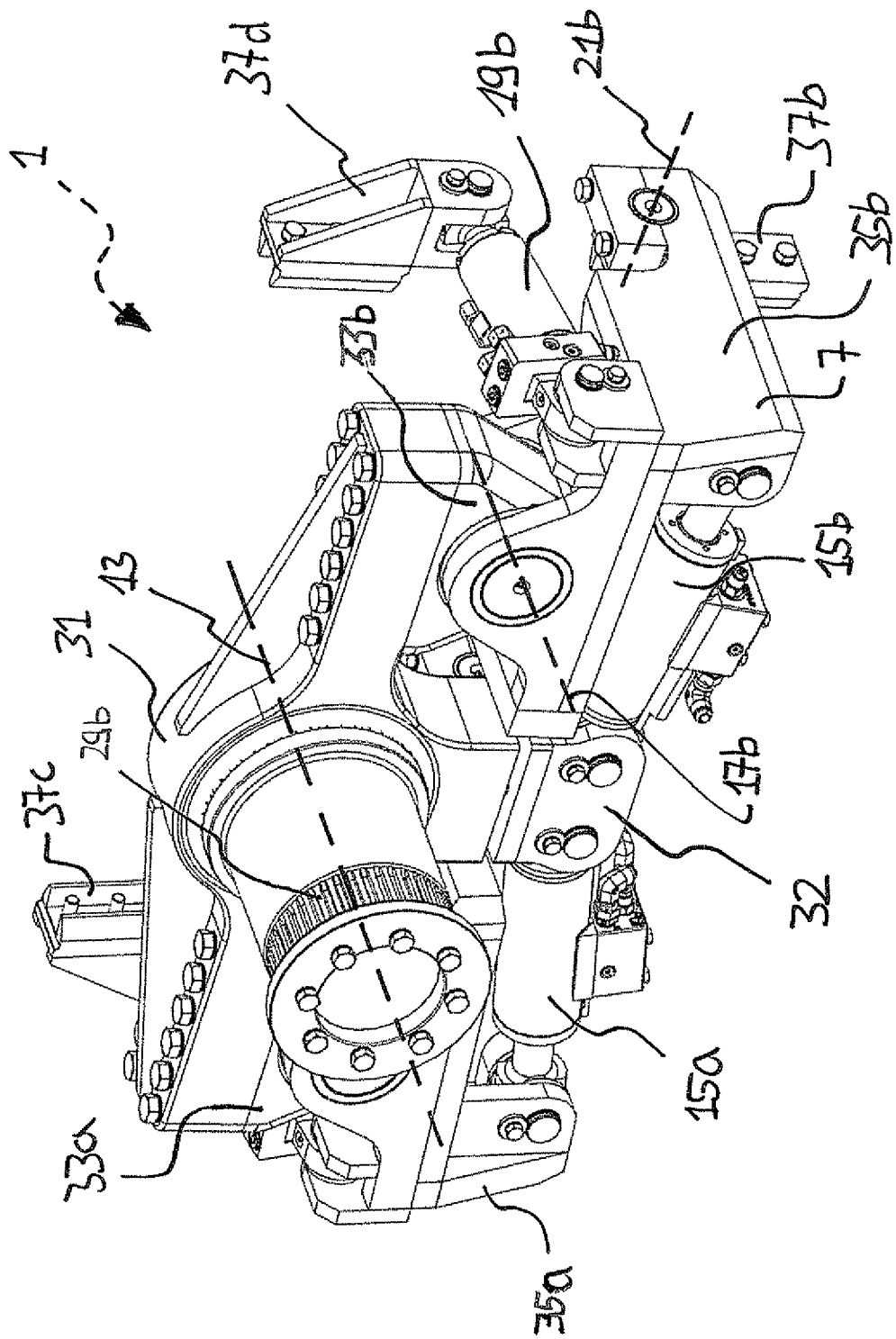
FIG. 12 is a magnified perspective view of parts of the device of FIG. 8.
Figure 13:
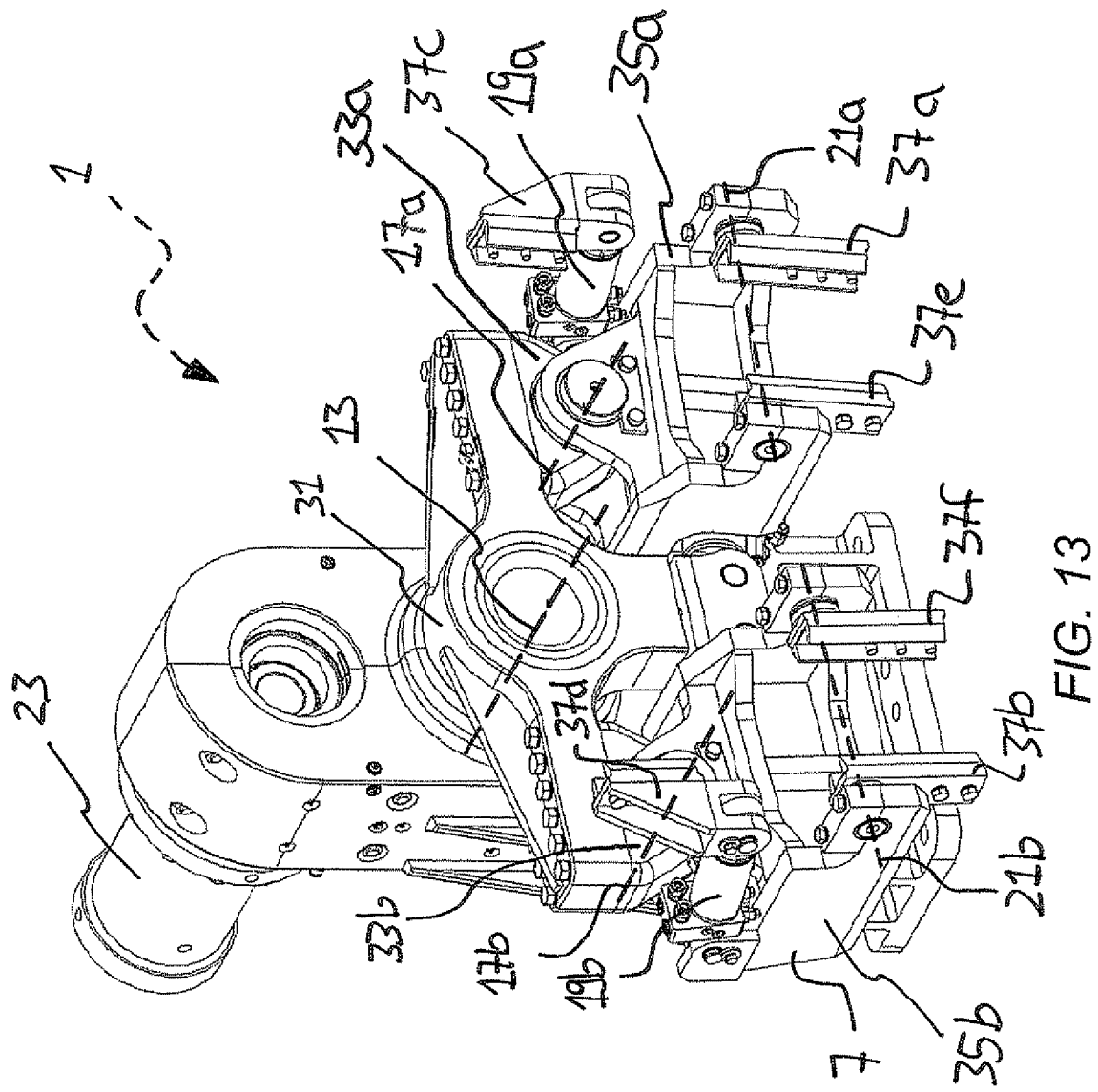
FIG. 13 is another perspective view of parts of the device of FIG. 8.

Referring to FIGS. 12 and 13, the first actuator 15a, the second actuator 15b, the third actuator 19a and the forth actuator 19b comprise a hydraulic cylinder or any other kind of a linear actuator. The hydraulic cylinder of each of the actuators 15a, 15b, 19a, 19b is operatively coupled with a control unit allowing for an independent control of each of the cylinders. The swivel motor 23 is also operatively coupled with the control unit and is independently controllable from the hydraulic cylinders of the actuators 15a, 15b, 19a, 19b.

The first intermediate element 35a is rotatably mounted to opposite holding members 37a, 37e. The first intermediate element 35a and the holding members 37a, 37e are relatively movable to each other about the first pivot axis 21a. The second intermediate element 35b is rotatably mounted to opposite holding members 37b, 37f. The second intermediate element 35b and the holding members 37a, 37e are relatively movable to each other about the first pivot axis 21b.

The third actuator 19a is mounted between the first intermediate element 35a and a holding member 37c. The fourth actuator 19b is mounted between the second intermediate element 35b and the holding member 37d. The holding members 37a, 37c, 37e are configured for being mounted to the first bolting unit 9a. The holding members 37b, 37d, 37f are configured for being mounted to the second bolting unit 9b.

The device 1 for the installation of rock bolts 3a, 3b can be used in a cutting apparatus 100 (FIGS. 1 to 7) suitable for creating tunnels or subterranean roadways and the like.

Such a cutting apparatus 100 comprises at least a drive unit for moving the cutting apparatus 100 in a machine direction 27 (FIGS. 5 and 6), a cutting arm 121 configured for pivotal movement about at least one axis 401 (e.g. FIG. 4) and a cutting head 128 mounted to the cutting arm 121, wherein the cutting head 128 comprises at least one rotatable cutting element 127 for detaching material from a rock face 11.

It is preferred, that the common axis of rotation 13 of the device 1 for the installation of rock bolts is parallel to the machine direction 27 of the cutting apparatus 100. It is further preferred, that the first and second tilting axes 17a, 17b are parallel to the machine direction 27 of the apparatus 100. Also, it is preferred that the first and second pivot axes 21a, 21b of the device 1 are perpendicular to the machine direction 27 of the apparatus 100.

It is also an option that a linear actuator is mounted to the supporting structure 7 (not shown in drawings). The linear actuator is configured for linearly moving the supporting structure 7 along in linear axis. The linear axis is preferably parallel to the machine direction 27 of the apparatus 100 on which the device 1 is mounted.

EXEMPLARY EMBODIMENTS

Embodiment 1

Cutting apparatus (100) suitable for creating tunnels or subterranean roadways and the like comprising:
- a main frame (102) having generally upward (300), downward (301) and side (302) facing regions;
- a first and second support (120) pivotally mounted relative to the main frame (102) via respective first and second support axes (400) aligned generally upright relative to the upward (300) and downward (301) facing regions such that each first and second support (120) is configured to pivot laterally in a sideways direction relative to the side (302) facing regions;
- at least one first and second support actuator (117) to respectively actuate independently movement of each of the first and second supports (120) relative to the main frame (102);
- a first and second arm (121) each pivotally mounted to the respective first and second (120) support via a respective arm pivot axis (401) aligned in a direction extending transverse including perpendicular to each support pivot axis (400) to enable the first and second arms (121) to pivot independently of one another and to pivot relative to each of the respective first and second supports (120) in an upward and downward direction relative to the upward (300) and downward (301) facing regions;
- at least one first and second arm actuator (122, 130) to actuate independently pivoting movement of the first and second arms (121) relatives to each of the respective first and second support (120);
- a rotatable cutting head (128) mounted at each of the first and second arms (121), each head (128) rotatable about a head axis (402) orientated to extend substantially transverse to each respective arm pivot axis (401).

Embodiment 2

The apparatus of embodiment 1 wherein each cutting head comprises a generally annular cutting edge or layered cutting edges to provide an undercutting mode of operation.

Embodiment 3

The apparatus of embodiment 1 or 2 further comprising a plurality of roller cutters (127) independently rotatably mounted at each rotatable cutting head (128).

Embodiment 4

The apparatus of embodiment claim 3 wherein the plurality of roller cutters (127) are generally annular roller cutters each having a generally annular cutting edge or layered cutting edges to provide an undercutting mode of operation.

Embodiment 5

The apparatus of any one of the preceding embodiments wherein each of the first and second arm actuator (122, 130) comprises a planetary gear assembly mounted at the junction at which each arm (121) pivots relative to each support (120).

Embodiment 6

The apparatus of any one of the preceding embodiments wherein at least one of the first and second arm actuator (122, 130) comprises at least one first drive motor to drive the pivoting movement of the first and/or second arm (121) relative to the respective first and second support (120).

Embodiment 7

The apparatus of any one of the preceding embodiments further comprising at least one second drive motor (125) to drive rotation of the cutting head (128) at the first and/or the second arm (121).

Embodiment 8

The apparatus of any one of the preceding embodiments wherein the first and second support actuator (117) comprises a hydraulic linear actuator.

Embodiment 9

The apparatus of any one of the preceding embodiments further comprising a powered sled (104) movably mounted at the main frame (102) to be configured to slide in a forward cutting direction of the apparatus (100) relative to the main frame (102).

Embodiment 10

The apparatus of embodiment 9 wherein each of the first and second cutting head (128) is mounted at the sled (104) via the respective first and second arms (121) and supports (120) so as to be configured to advance in the forward cutting direction.

Embodiment 11

The apparatus of any one of the preceding embodiments wherein:
- each of the first and second arms (121) is configured to pivot in the upward and downward direction by up to 180°; and each of the first and second supports (120) is configured to pivot in the lateral sideways direction by up to 90°.

Embodiment 12

The apparatus of any one of the preceding embodiments further comprising tracks (103) or wheels mounted at the main frame (102) to allow the apparatus (100) to move in a forward and rearward direction.

Embodiment 13

The apparatus of any one of the preceding embodiments further comprising floor and roof engaging members (106, 115, 105, 108) mounted at the main frame (102), at least the floor engaging members (106, 115) being extendable and retractable to respectively raise and lower the apparatus (100) in the upward and downward direction.

Embodiment 14

The apparatus of any one of the preceding embodiments further comprising:
a first material discharge conveyor (202) to convey cut material rearwardly from the first and second cutting head (128); and
a gathering head (129) to direct cut material onto the conveyor (202), the gathering head (129) positioned rearwardly behind at least one of the first and second cutting heads (128).

Embodiment 15

The apparatus of embodiment 14 further comprising a control unit (101) demountably connectable to the apparatus (100), the control unit (101) comprising operational components (114) to power at least the first and second support (120) and arm actuators (122, 130), the control unit (101) further comprising a second conveyor (112) to receive material from the first conveyor (202) and to discharge the material at a position rearward of the apparatus (100) and the control unit (101).

Embodiment 16

Cutting apparatus (100) suitable for creating tunnels or subterranean roadways and the like comprising:
a main frame (102) having generally upward (300), downward (301) and side (302) facing regions;
a powered sled (104) movably mounted at the main frame (102) to be configured to slide in a forward cutting direction of the apparatus (100) relative to the main frame (102);
a first and second arm (121) pivotally mounted to the sled (104) by respective pivot arm axes (401) aligned in a direction extending transverse including perpendicular to a longitudinal axis of the main frame (102) to allow each arm (121) to pivot independently of one another in an upward and downward direction relative to the upward and downward facing region of the main frame (102);
at least one first and second arm actuator (122, 130) to actuate independent pivoting movement of the first and second arms (121) relative to one another and the main frame (102);
a rotatable cutting head (128) mounted at each of the first and second arms (121) so as to be configured to be moved in the upward and downward direction and advanced in the forward cutting direction, each head (128) rotatable about a head axis (402) orientated to extend substantially transverse to respective pivot arm axes (401).

Embodiment 17

The apparatus of embodiment 16 wherein each first and second arm (121) together with the respective pivot arm axes is respectively mounted to the sled (104) via a first and second support (120) that is slidably mounted relative to the sled (104) via a common or respective slidable means such that each first and second support (120) is configured to slide laterally in a sideways direction relative to the side facing regions (302).

Embodiment 18

The apparatus of embodiment 16 or 17 wherein each rotatable cutting head (128) comprises a generally annular roller cutter (127) each having a generally annular cutting edge or layered cutting edges to provide an undercutting mode of operation.

Embodiment 19

The apparatus of any one of embodiments 16 to 18 further comprising a plurality of roller cutters (127) independently rotatably mounted at each rotatable cutting head (128).

Embodiment 20

The apparatus of embodiment 19 wherein the plurality of roller cutters (127) are generally annular roller cutters each having a generally annular cutting edge or layered cutting edges to provide an undercutting mode of operation.

Embodiment 21

The apparatus of any one of embodiments 17 to 20 wherein each of the first and second arm actuator (122, 130) comprises a planetary gear assembly mounted at the junction at which each arm (121) pivots relative to each support.

The features of the embodiments presented hereinabove are understood to be, alone or in combination with each other, preferred embodiments of the invention in themselves as well as in combination with what is claimed hereinafter.

The invention claimed is:

1. A device for the installation of rock bolts, the device comprising:
a supporting structure;
first and second bolting units mounted to the supporting structure, each bolting unit being configured for drilling an installation hole and/or for installing a rock bolt into a rock face, wherein the supporting structure is configured for rotatably moving the first and second bolting units about a common axis of rotation; and
at least one actuator mounted to the supporting structure and configured for additionally moving at least one of the first and second bolting units, wherein the first and second bolting units are mounted within a common plane extending perpendicular to the common axis of rotation.

2. The device according to claim 1, wherein the at least one actuator includes a first actuator configured for additionally moving the first bolting unit and a second actuator mounted to the supporting structure and configured for additionally moving the second bolting unit.

3. The device according to claim 2, wherein the first actuator is configured for rotatably moving the first bolting unit about a first tilting axis.

4. The device according to claim 3, wherein the second actuator is configured for rotatably moving the second bolting unit about a second tilting axis.

5. The device according to claim 4, wherein the first tilting axis and/or the second tilting axis is parallel to the common axis of rotation.

6. The device according to claim 2, wherein a third actuator is mounted to the supporting structure and configured for rotatably moving the first bolting unit about a first pivot axis.

7. The device according to claim 6, wherein a fourth actuator is mounted to the supporting structure and configured for rotatably moving the second bolting unit about a second pivot axis.

8. The device according to claim 7, wherein the first pivot axis and/or the second pivot axis is perpendicular to the common axis of rotation.

9. The device according to claim 7, wherein the first actuator, the second actuator, the third actuator and/or the fourth actuator include a linear actuator.

10. The device of claim 9, wherein the linear actuator is a hydraulic cylinder.

11. The device according to claim 1, wherein a swivel motor is arranged to move the first and second bolting units about the common axis of rotation.

12. The device according to claim 11, further comprising a gear unit disposed between the swivel motor and the supporting structure, the gear unit having a gear ratio in the range of 0.5 and 2.

13. A cutting apparatus suitable for creating tunnels or subterranean roadways and the like, comprising:

a drive unit arranged to move the cutting apparatus in a machine direction;

a cutting arm configured for pivotal movement around at least one axis;

a cutting head mounted to the cutting arm, the cutting head having at least one rotatable cutting element arranged to detach material from a rock face; and a device for the installation of rock bolts, the device including a supporting structure, first and second bolting units mounted to the supporting structure, each bolting unit being configured for drilling an installation hole and/or for installing a rock bolt into a rock face, wherein the supporting structure is configured for rotatably moving the first and second bolting units about a common axis of rotation, and at least one actuator mounted to the supporting structure and configured for additional movement of at least one of the first and second bolting units, wherein the first and second bolting units are mounted within a common plane extending perpendicular to the common axis of rotation.

14. The cutting apparatus according to claim 13, wherein the common axis of rotation is parallel to the machine direction.

15. The cutting apparatus according to claim 13, wherein the at least one actuator includes a first actuator configured for additionally moving the first bolting unit and a second actuator mounted to the supporting structure and configured for additionally moving the second bolting unit.

16. The cutting apparatus according to claim 15, wherein the first actuator is configured for rotatably moving the first bolting unit about a first tilting axis.

17. The cutting apparatus according to claim 16, wherein the second actuator is configured for rotatably moving the second bolting unit about a second tilting axis.

* * * * *